US012738810B2

(12) United States Patent
Cook et al.

(10) Patent No.: US 12,738,810 B2
(45) Date of Patent: Sep. 15, 2026

(54) ELECTRIC MOTOR COOLING SYSTEM

(71) Applicant: Dana Automotive Systems Group, LLC, Maumee, OH (US)

(72) Inventors: Christopher M. Cook, McKenzie, TN (US); Matthew K. Paschall, Medina, TN (US); John Bruzewski, Buchanan, TN (US); Jason D. Wimberley, Paris, TN (US); Dakota W. Foster, Paris, TN (US); Randy Mathis, Paris, TN (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 161 days.

(21) Appl. No.: 18/912,035

(22) Filed: Oct. 10, 2024

(65) Prior Publication Data

US 2025/0125687 A1 Apr. 17, 2025

Related U.S. Application Data

(60) Provisional application No. 63/591,025, filed on Oct. 17, 2023.

(51) Int. Cl.
*H02K 9/193* (2006.01)
*H02K 9/197* (2006.01)

(52) U.S. Cl.
CPC ............. *H02K 9/193* (2013.01); *H02K 9/197* (2013.01); *H02K 2209/00* (2013.01)

(58) Field of Classification Search
CPC .... H02K 9/193; H02K 9/197; H02K 2209/00; F16J 15/32; F16J 15/34
See application file for complete search history.

(56) References Cited

U.S. PATENT DOCUMENTS 8,558,422 B2 * 10/2013 Baumann ............... H02K 9/197 310/52
11,125,315 B2 * 9/2021 Graves ................... H02K 9/193
11,658,533 B2 * 5/2023 Leonardi .................. H02K 9/19 310/58

* cited by examiner

*Primary Examiner* — Tulsidas C Patel
*Assistant Examiner* — Mohammed Ahmed Qureshi
(74) *Attorney, Agent, or Firm* — McCoy Russell LLP

(57) ABSTRACT

Systems for preventing leakage of coolant in an electric motor cooling system. In one example, a sealing ring configured with a stator seal may be integrated as part of a sealing assembly of a cooling system. The sealing ring includes a flange, a plurality of channels that is positioned radially on the sealing ring, a plurality of notches, a plurality of surface grooves, an elevated region that are configured with anchors that retain the seal, a depressed region wherein a plurality of retention posts is positioned therein, a peripheral groove positioned on a peripheral edge of the sealing ring and spaced between two sides of the sealing ring, and wherein the seal is integrated with an inner edge of the sealing ring and extends from the inner diameter to the elevated region of the sealing ring.

20 Claims, 4 Drawing Sheets

ELECTRIC MOTOR COOLING SYSTEM

CROSS REFERENCE TO RELATED APPLICATION

The present application claims priority to U.S. Provisional Application No. 63/591,025, entitled "ELECTRIC MOTOR COOLING SYSTEM", and filed on Oct. 17, 2023. The entire contents of the above-listed application are hereby incorporated by reference for all purposes.

TECHNICAL FIELD

The present disclosure relates to an electric motor with a cooling system that includes a sealing assembly that provides sealing between a stator and a sealing component.

BACKGROUND AND SUMMARY

In electric vehicle (EV) motor applications, stator winding cooling has been used in an attempt to achieve greater motor efficiency. For instance, efficiency targets may demand the flow of oil across the stator, in certain applications. However, in certain prior cooling system designs, oil is directed through interior cavities from which oil can leak into the air gap between the rotor and the stator. Oil in the air gap results in drag losses which results in a significant decrease in motor efficiency. The inventors have recognized that sealing the stator cooling arrangement off from other regions of the motor, such as the rotor cavity, avoids an undesirable drop in motor efficiency. In particular, existing cooling systems arranged with sealing rings and sealing sleeves do not adequately provide sufficient sealing between the sealing ring and a stator face of the stator.

To overcome at least some of the abovementioned issues the inventors developed an elastomeric seal coupled to a sealing ring that may be integrated into a motor cooling system that comprises sealing rings and sealing sleeves. In one example, the sealing ring configured with a seal includes a flange positioned on one side of the sealing ring, a plurality of channels that is positioned radially on the sealing ring, a plurality of notches that is aligned with each channel, a plurality of surface grooves wherein each surface groove is positioned between two adjacent channels, an elevated region that is positioned near an outer diameter of the sealing ring and configured with anchors that retain the seal, a depressed region that is positioned near an inner diameter of the sealing ring, a plurality of retention posts positioned in the depressed region of the sealing ring, a peripheral groove positioned on a peripheral edge of the sealing ring and spaced between two sides of the sealing ring, and wherein the seal is integrated with an inner edge of the sealing ring and extends from the inner diameter to the elevated region of the sealing ring. The seal is compressed between the stator and the sealing sleeve. In this way, the sealed cavity formed by the arrangement of the sealing ring and the sealing sleeve prevents fluid flow into the rotor cavity and specifically the motor's air gap. Consequently, the motor can achieve a target efficiency, if so desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A sealing assembly integrated within an immersion cooling system to enable an electric motor to achieve a target efficiency is described herein. The sealing assembly includes a sealing ring configured with a seal and a sealing sleeve that are arranged to form a sealed cavity around stator end windings. The sealing ring may be configured with coupling features that enable the seal to be coupled to the sealing ring. The seal prevents the coolant from entering a rotor cavity at a location wherein the sealing ring and an axial side of the stator are touching. Integrating the seal onto the sealing ring may reduce drag losses caused by coolant in the air gap. The geometry of the bead profile of the seal compresses in a manner that does not intrude into a rotor cavity of the electric motor and allows for constant sealing pressure and contact width of the seal without over-stressing the elastomeric material. Consequently, the seal between the sealing ring and stator may be efficiently and securely retained within the motor, thereby reducing the likelihood of coolant leakage from the sealed cavity at a location between the sealing ring and the stator.

Figure 1:
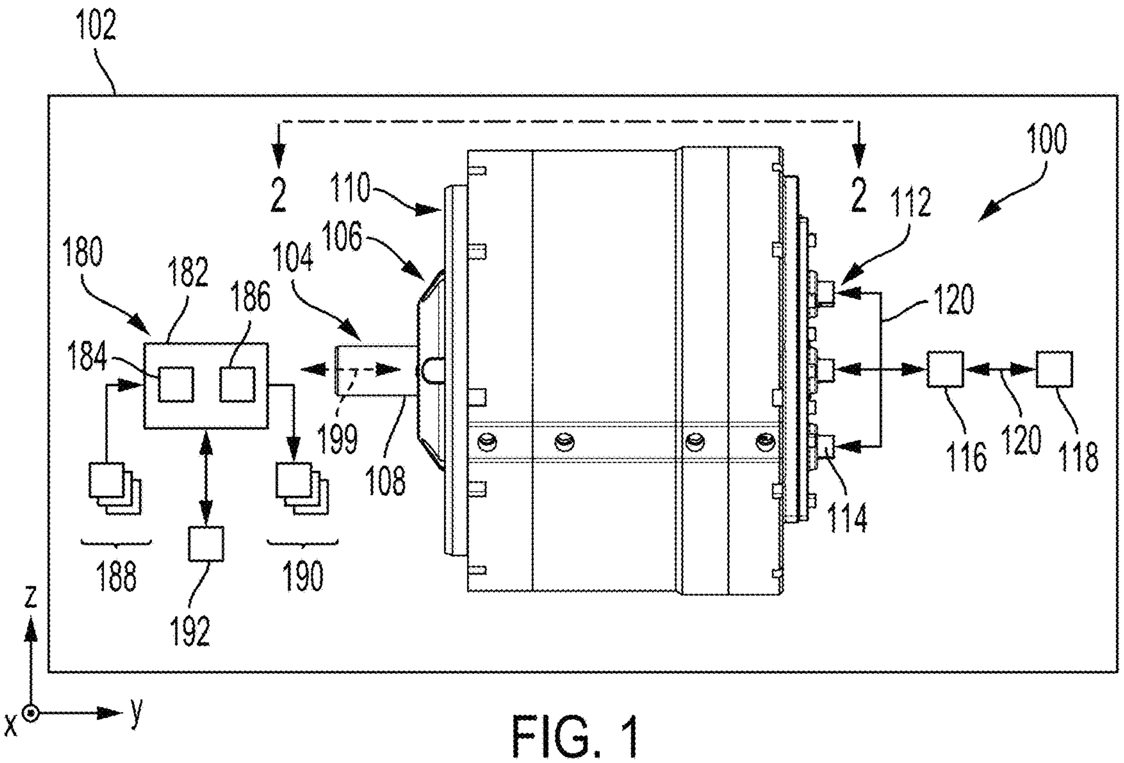
FIG. 1 shows an electric motor with a cooling system.

FIG. 1 shows an illustration of an electric motor 100. The electric motor 100 may be designed as an electric motor-generator and may be included in a system 102 which may take a variety forms. For instance, the electric motor 100 may be incorporated into an electric drive system of an electric vehicle (EV), in one example. As such, the electric motor is a traction motor in such an example and the electric drive may further include a transmission (e.g., gearbox), for instance. In the EV example, the EV may be an all-electric vehicle (e.g., a battery electric vehicle (BEV)), in one example, or a hybrid electric vehicle (HEV) with an internal combustion engine, in another example. However, the motor may be used in other suitable systems (e.g., stationary systems), in other examples, such as in industrial machines, agricultural systems, mining systems, and the like.

The electric motor 100 includes a rotor 104 that electromagnetically interacts with a stator 106 to drive rotation of a rotor shaft 108 that is included in the rotor. The electric motor 100 in the illustrated example includes a housing 110 with an electrical interface 112 for the stator 106. The electrical interface 112 may be a multi-phase electrical interface with multiple electrical connectors 114. The electrical interface 112 is a three-phase interface, in the illustrated example. However, it will be understood that the electrical interface may be a six phase interface or a nine phase interface, in other examples. More generally, the electric motor 100 may be a multi-phase alternating current (AC) machine. However, in other examples, the electric motor 100 may be a direct current (DC) machine.

As illustrated in FIG. 1, the electric motor 100 may be electrically coupled to an inverter 116. The inverter 116 is designed to convert direct current (DC) power to alternating current (AC) power and vice versa. As such, the electric motor 100 may be an AC electric motor, as indicated above. However, in other examples, the electric motor 100 may be a DC electric motor (as previously indicated) and the inverter 116 may therefore be omitted from the system 102. The inverter 116 may receive electric energy from one or more energy storage device(s) 118 (e.g., traction batteries, capacitors, combinations thereof, and the like). Arrows 120 signify the electric energy transfer between the electric motor 100, the inverter 116, and the energy storage device(s) 118 that may occur during different modes of system operation.

The system 102 may additionally include a control subsystem 180 with a controller 182. The controller 182 includes a processor 184 and memory 186. The memory 186 may hold instructions stored therein that when executed by the processor 184 cause the controller 182 to perform the various methods, control techniques, and the like, described herein. The processor 184 may include a microprocessor unit and/or other types of circuits. The memory 186 may include known data storage mediums such as random access memory, read-only memory, keep alive memory, combinations thereof, and the like.

The controller 182 may receive various signals from sensors 188 positioned in different locations in the system 102. The sensors 188 may include an electric machine speed sensor, energy storage device temperature sensor(s), an energy storage device state of charge sensor(s), an inverter power sensor, and the like. The controller 182 may also send control signals to various actuators 190 coupled at different locations in the system 102. For instance, the controller may send signals to the inverter 116 to adjust the rotational speed of the electric motor 100. In another example, the controller 182 may send a command signal to the electric motor 100 and/or the inverter 116 and in response motor speed may be adjusted. The other controllable components in the system 102 may function in a similar manner with regard to command signals and actuator adjustment.

The system 102 may also include one or more input device(s) 192 (e.g., an accelerator pedal, a brake pedal, a console instrument panel, a touch interface, a touch panel, a keyboard, combinations thereof, and the like). The input device(s) 192, responsive to user input, may generate a motor speed adjustment request.

Figure 2:
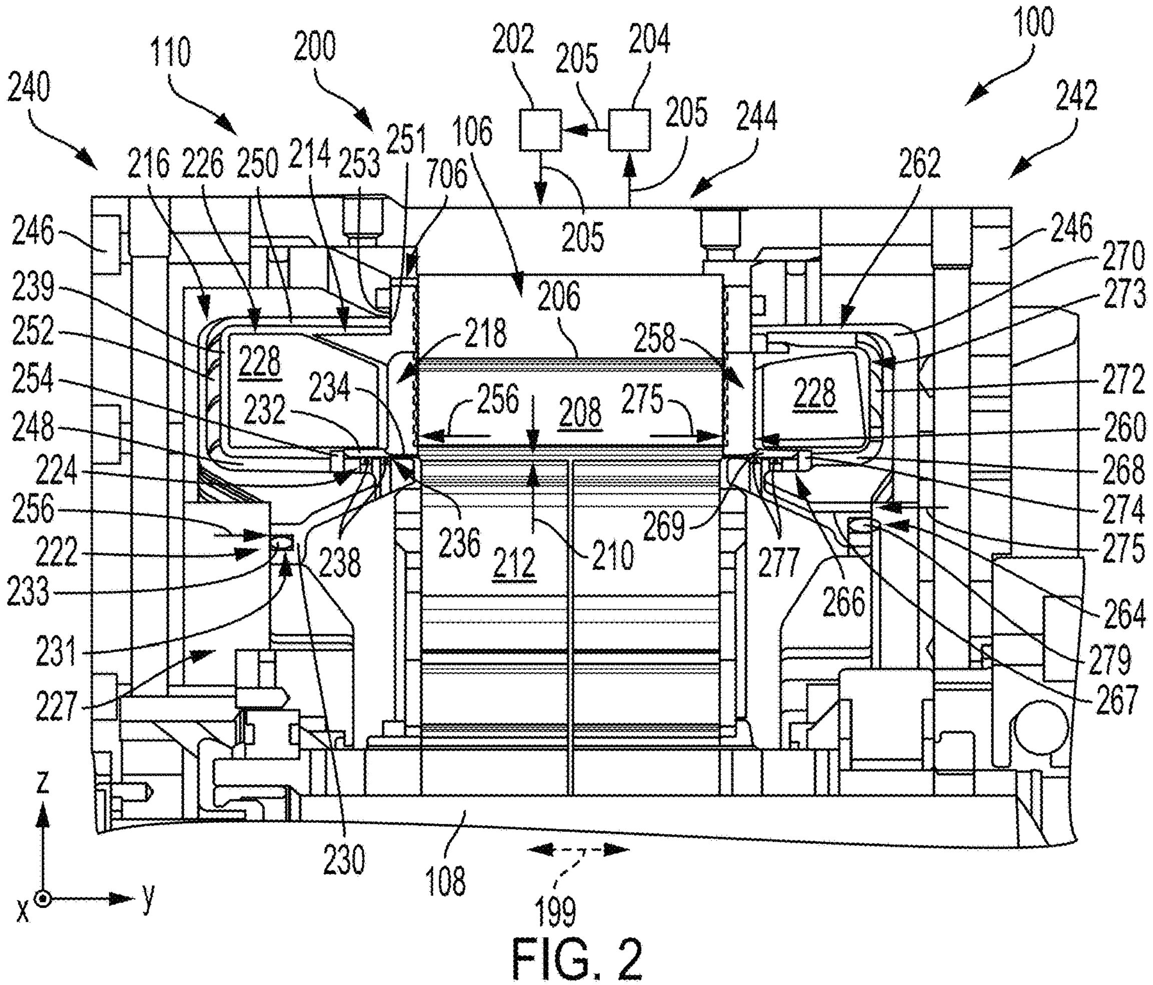
FIG. 2 shows a cross-sectional view of the electric motor and cooling system depicted in FIG. 1.

An axis system is provided in FIG. 1, as well as FIG. 2, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Rotational axis 199 of the electric motor 100 is further provided for reference in FIG. 1 as well as FIG. 2. A cutting plane 2-2 for the cross-sectional view depicted in FIG. 2 is provided in FIG. 1. The cutting plane 2-2 extends through the motor's rotational axis.

FIG. 2 shows a cross-sectional view of the electric motor 100 and the cooling system 200 for the motor. The rotor 104 and the stator 106 of the electric motor 100 are again depicted along with the housing 110 that at least partially encloses the rotor and the stator. The rotor shaft 108 is further illustrated in FIG. 2.

The cooling system 200 may include a pump 202 and a filter 204 that deliver a coolant (e.g., oil such as a natural and/or synthetic oil) into the stator 106. Arrows 205 depict the flow of coolant between the pump 202, the filter 204, and the cooling system 200. To elaborate, the pump 202 may deliver coolant to passages 206 that axially traverse a core 208 of the stator 106, in one example. However, other coolant flow patterns may be used in other examples. The pump 202 and the filter 204 are schematically depicted. However, it will be understood that they may have greater complexity, in practice. Further, the pump and the filter are shown spaced away from the electric motor 100.

An air gap 210 is formed between a core 212 of the rotor 104 and the stator core 208. Due to the sealing of the coolant in the cooling system 200 expanded upon herein, the likelihood of coolant entering the air gap is significantly reduced (e.g., avoided).

The cooling system 200 further includes a first sealing ring 214 and a first sealing sleeve 216 that are positioned on a first axial side 218 of the stator 106 (e.g., the stator core 208). The first axial side 218 may specifically be a weld side, in one example. The first sealing ring 214 may be coupled to the stator 106 (e.g., the stator core). Specifically, in one example, the first sealing ring 214 may be adhesively attached to the stator 106. However, in other examples, the first sealing ring may be machined or otherwise integrally formed in the stator 106.

Figure 4:
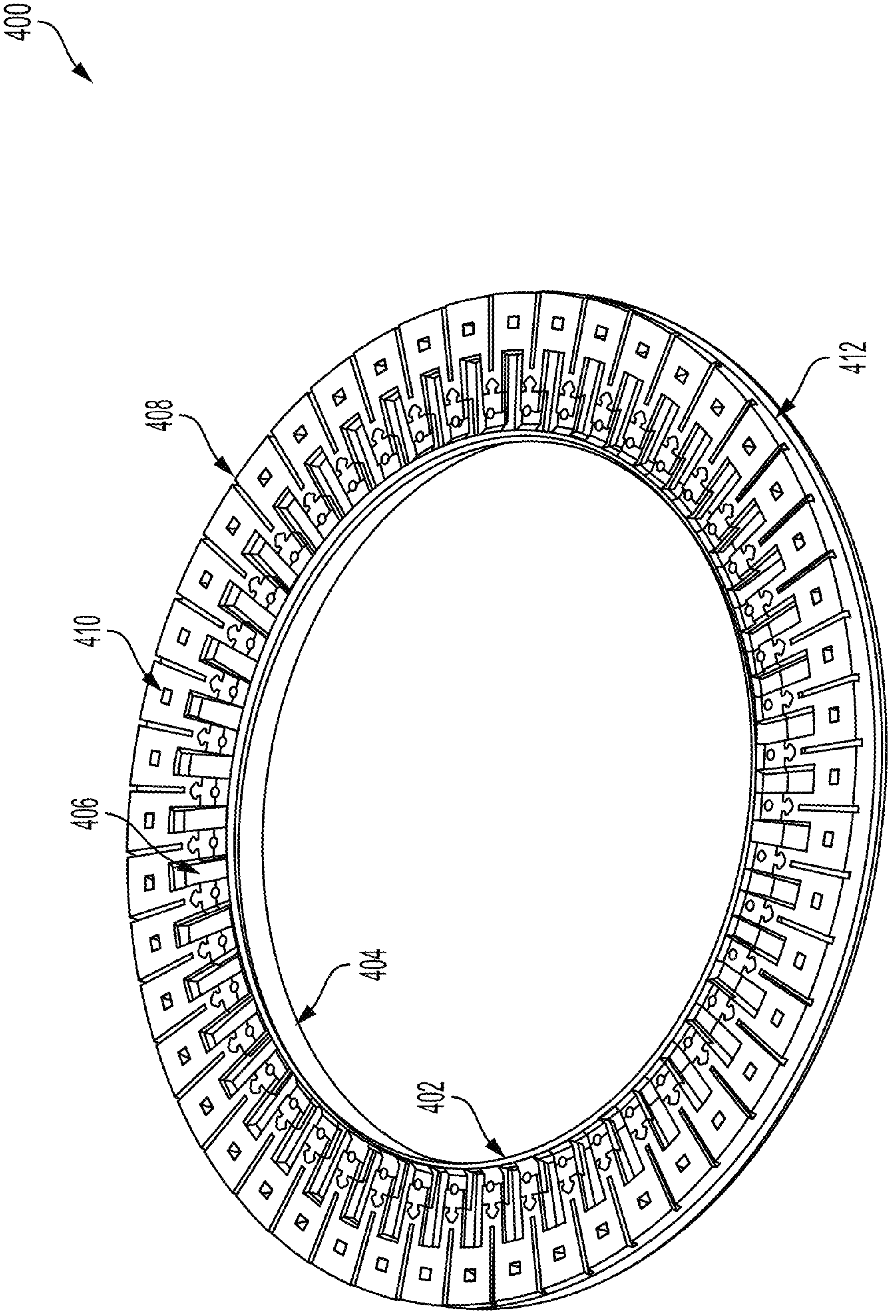
FIG. 4 shows a detailed example of a sealing sleeve with an example seal arranged therein.
Figure 5B:
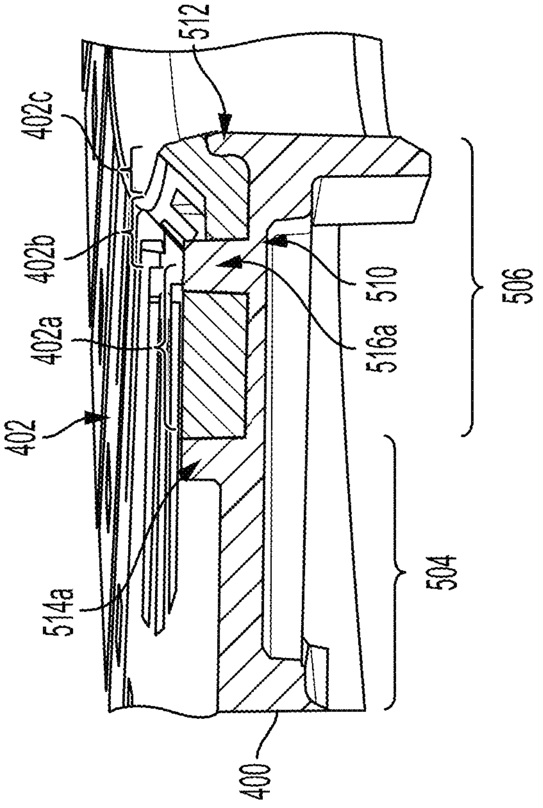
FIGS. 5A and 5B show different views of a sealing ring integrated with a seal integrated within the cooling system of the electric motor depicted in FIG. 1.

The first sealing ring 214 may be configured with a stator seal that is positioned along an edge of an inner diameter of the first sealing ring 214. The stator seal prevents coolant from entering the rotor cavity from a location between the first sealing ring 214 and the stator 106. An example of the sealing ring is depicted in FIGS. 4-5B. The first sealing ring 214 may be included as part of a sealing assembly that includes a sealing ring configured with the stator seal that is positioned between the sealing ring and the stator and a sealing sleeve. The sealing sleeve is described in detail in FIG. 3.

The first sealing sleeve 216 and the first sealing ring 214 are coupled via a first sealing interface 222 and a second sealing interface 224 which form a sealed cavity 226 in which the stator end winding 228 are positioned. The sealed cavity 226 may receive and/or deliver coolant to/from the coolant passages 206 in the stator core 208. The sealed cavity 226 is specifically fluidly separated from a rotor cavity 227. In this way, coolant entering the air gap which creates drag losses in the motor can be avoided, thereby increasing motor efficiency.

The first sealing interface 222 may be formed between the housing 110 and an extension 230 of the first sealing sleeve 216 that is positioned radially inward from the end windings 228. To elaborate, the first sealing interface 222 may include a recess 231 profiled to receive a seal 233 such as an O-ring, a gasket, a diamond seal, a liquid seal, and/or another suitable type of seal. The extension 230 of the first sealing sleeve 216 may taper in an axially inward direction to increase the strength of the sleeve when compared to a shoulder formed as a thinner wall.

The first sealing ring 214 includes a flange 232 that axially extends outward from the first axial side 218 of the stator 106. The flange 232 seals against an interior surface 234 of the first sealing sleeve 216 to form the second sealing interface 224. The second sealing interface 224 may specifically be formed as a radial sealing interface. Therefore, at the second sealing interface 224, the flange 232 and the interior surface 234 of the first sealing sleeve 216 to enable a strong seal to be achieved. However, other types of sealing interfaces may be used, in other examples. The interior surface 234 of the first sealing sleeve 216 may include recesses 236 sized to receive seals 238 such as O-rings, grommets, a liquid seal, and and/or another suitable type of seal.

The second sealing interface 224 may be positioned radially inward from the stator end winding 228 but radially outward from the first sealing interface 222, in one example. In this way, the sealed cavity 226 may be securely sealed to provide a coolant enclosure for the end windings 228. Coolant 239 circulates around the cavity and specifically through the end windings 228 to increase stator cooling when compared to systems that solely direct coolant around the end windings 228.

The housing 110 may be formed in different sections that are coupled to one another, in one example. For instance, a crown side section 240 and a weld side section 242 may be coupled to a housing body 244. The housing body 244 may circumferentially enclose the stator 106 and sealing sleeves and rings in the cooling system 200. Fasteners 246 and/or other suitable attachment devices may be used to attach the crown side section 240 and/or the weld side section 242 to the housing body 244.

The first sealing sleeve 216 may include an inner radial wall 248, an outer radial wall 250, and an axial wall 252 that allow for the sealed cavity 226 to enclose the end windings 228. However, other contours of the first sealing sleeve 216 may be used in other examples. For instance, the first sealing sleeve may include curved sections that enclose the end windings.

An end 251 of the outer radial wall 250 may be adjacent to or in face sharing contact with a surface 253 of an outer circumferential section 706. In this way, the upper section of the cavity 226 may be formed. However, other profiles of the sealing sleeve and ring may be used, in other examples.

The first sealing sleeve 216 in the second sealing interface 224 includes a shoulder 254 that allows for the axial compression of the sealing assembly to be tuned. To elaborate, the shoulder 254 hard mounts to the first sealing ring 214, when the sealing assembly is installed in the housing 110 under compression. Arrows 256 indicate the compressive force exerted on the assembly formed between the first sealing ring 214 and the first sealing sleeve 216. In this way, the first sealing ring and the sleeve may be effectively maintained in a desired position. Due to this compressive attachment of the sealing ring and sleeve in the housing the use of attachment devices for securing the ring and/or sleeve to the housing may be avoided, if desired. Consequently, manufacturing efficiency may be increased in relation to systems which utilize fasteners. A second sealing ring 260 and a second sealing sleeve 262, described in greater detail herein, may be compressed in a similar manner.

The passages 206 may extend through the stator core 208 from the first axial side 218 to a second axial side 258. In this way, coolant axially traverse the stator to enable heat to be effectively removed therefrom. The motor can consequently achieve greater efficiency, if so desired, when compared to prior motor cooling systems.

A second sealing ring 260 and a second sealing sleeve 262 are positioned on the second axial side 258 (e.g., a crown side) of the stator 106, in the illustrated example. The second sealing ring 260 may also be configured with the stator seal and integrated within the sealing assembly described in FIGS. 3-5B to prevent coolant from leaking into the rotor cavity at a location between the second sealing ring 260 and the stator 106. However, in other examples, the second sealing ring and sleeve may be omitted from the motor cooling system.

Similar to the first sealing ring and sleeve, the second sealing ring 260 and the second sealing sleeve 262 may form a third sealing interface 264 and a fourth sealing interface 266. Again, the third sealing interface 264 may be a face seal formed between the housing 110 and an extension 267 and the fourth sealing interface may be a radial seal formed between a flange 269 of the second sealing ring 260. The second sealing ring 260 and the second sealing sleeve 262 may be differently sized from the first sealing ring and the first sealing sleeve to accommodate for the varied sizes of the weld and crown side end windings. However, the second sealing ring 260 and the second sealing sleeve 262 may include similar structural features to those included in the first sealing ring 214 and the first sealing sleeve 216. However, as expanded upon herein the second sealing sleeve may be contoured to accommodate for attachment between the electrical interface 112 and the stator end winding 228.

The second sealing ring 260 may be adhesively coupled to the stator core 208, in one example. However, in another example, the second sealing ring may be integrally formed with the stator core 208. Seals 277 may be included in the fourth sealing interface 266 and a seal 279 may be included in the third sealing interface 264. The seal 279 may include one or more of an O-ring, a gasket, a diamond seal, and a liquid seal. Further, the seals 277 may include one or more O-rings, grommets, and a liquid seal.

The second sealing sleeve 262 may include an inner radial wall 268, an outer radial wall 270, and an axial wall 272 that allow for a sealed cavity 273 to enclose the end windings 228. However, other contours of the second sealing sleeve 262 may be used in other examples.

The second sealing sleeve 262 again includes a shoulder 274 that has axially compressive force transmitted therethrough to enable the axial compression of the sealing assembly formed between the second sealing sleeve 262 and the second sealing ring 260 to be tuned as desired. This axial compression is represented via arrows 275.

Figure 3:
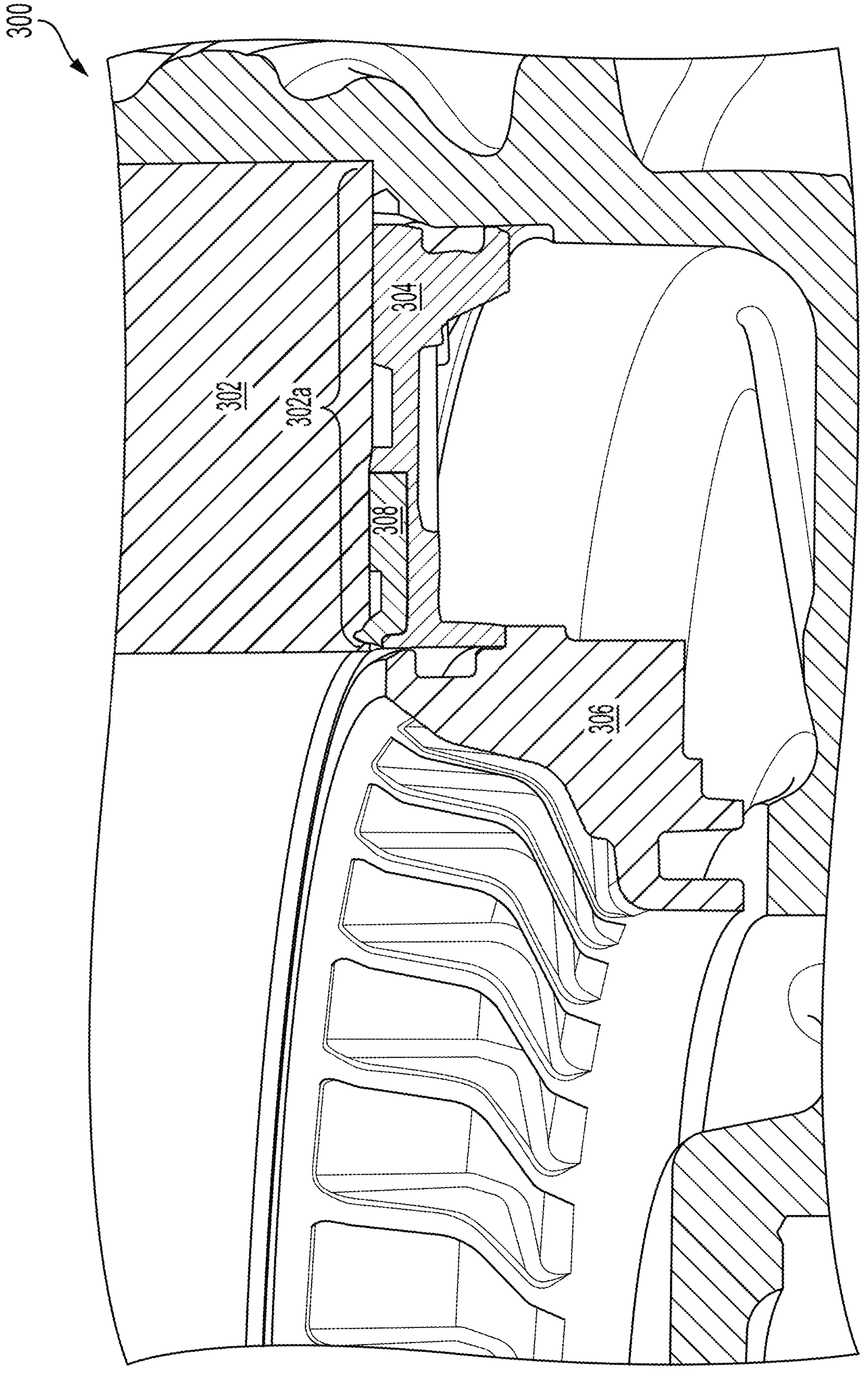
FIG. 3 shows an example sealing assembly wherein a sealing ring is configured with an example seal.

Turning to FIG. 3, a sealing assembly 300 of an electric motor cooling system of an electric motor, which may be embodiments of the cooling system 200 and electric motor 100 of FIGS. 1 and 2, respectively. The sealing assembly 300 may comprise a sealing ring 304 that is configured with a seal 308 and coupled to a stator 302. The sealing ring 304 may axially extend outward from an axial side of the stator 302 enabling the seal 308 to be spaced between the sealing ring and the stator on one side of the sealing assembly 300. In particular, the seal 308 may be spaced between a stator face 302*a* of the stator 302 and the sealing ring 304. The seal 308 is elastomeric. The stator face 302*a* has a 2.0 mm width sealing land wherein the seal 308 may be positioned. The sealing assembly 300 may further comprise a sealing sleeve 306 that extends from an axial side of the sealing ring and surrounds the sealing ring 304 to form a cavity. A stator end winding may be partially immersed in a coolant within the cavity.

The seal 308 may be an embodiment of the seals described above with respect to FIG. 2. The seal 308 may be coupled to the sealing ring 304 along an inner diameter (or inner edge) of the sealing ring via coupling features integrated within the sealing ring. The coupling features may include a plurality of anchors, a plurality of retention posts, an elevated region, and a depressed region, which are described in FIGS. 4-5B. The seal 308 may be aligned with an inner edge of the stator where a seal land is positioned to prevent coolant from leaking into a rotor cavity of the electric motor, which may be an embodiment of the electric motor described in FIG. 1. The seal 308 is compressed by the stator 302 and the sealing sleeve 306 to contain coolant within the cavity. The seal geometry enables constant sealing pressure and contact width when compressed by the stator 302 and sealing sleeve 306. Further, the sealing ring (304) and the sealing sleeve (306) are axially compressed between the axial side of the stator (302) and an interior surface of the motor housing.

FIG. 4 shows a sealing ring 400 configured with a seal 402 and a flange 404 that may be integrated as part of a cooling system of an electric motor. The sealing ring 400 may be an embodiment of the sealing ring 304 and the seal 402 may be an embodiment of the seal 308 of FIG. 3. The sealing ring 400 may include a plurality of channels 406, a plurality of surface grooves 408, a plurality of notches 410, and a peripheral groove 412.

The plurality of channels 406 is positioned radially on the sealing ring 400. In particular, the plurality of channels 406 is positioned towards an inner diameter of the sealing ring 400. The plurality of channels 406 are spaced apart from inner diameter of the sealing ring 400 by a pre-determined distance. The plurality of channels 406 may align with a stator such that coolant can pass through the plurality of channels 406 and be directed towards the end windings. The plurality of channels 406 may have a rectangular cross-sectional contour, in one example. However, other channel profiles have been contemplated.

The plurality of surface grooves 408 is positioned radially on the sealing ring 400. One end of each surface groove is positioned near the outer diameter of the sealing ring 400 and another end of the surface groove is positioned near a medial region of the sealing ring 400. More specifically, each surface groove extends from the end positioned near the outer diameter of the sealing ring 400 past an end of one channel located near the medial region of the sealing ring. Each surface groove of the plurality of surface grooves 408 is positioned between two adjacent channels. In this way, each surface groove is spaced apart and positioned between two adjacent channels. The peripheral groove is positioned on a peripheral edge of the sealing ring 400 and spaced between two sides of the sealing ring.

The plurality of notches 410 is positioned towards the outer diameter the sealing ring 400. Additionally, the plurality of notches 410 are spaced apart from the plurality of channels 406 by a pre-determined distance on one side and spaced apart from the outer diameter on the other side of the sealing ring 400 by another pre-determined distance. The plurality of notches 410 are aligned with each channel of the plurality of channels 406 such that each notch is spaced apart from and aligned with one channel. The plurality of notches 410 is spaced apart from each other by one surface groove. In this way, one notch is spaced apart and surrounded by one surface groove on each side of the respective notch.

Figure 5A:
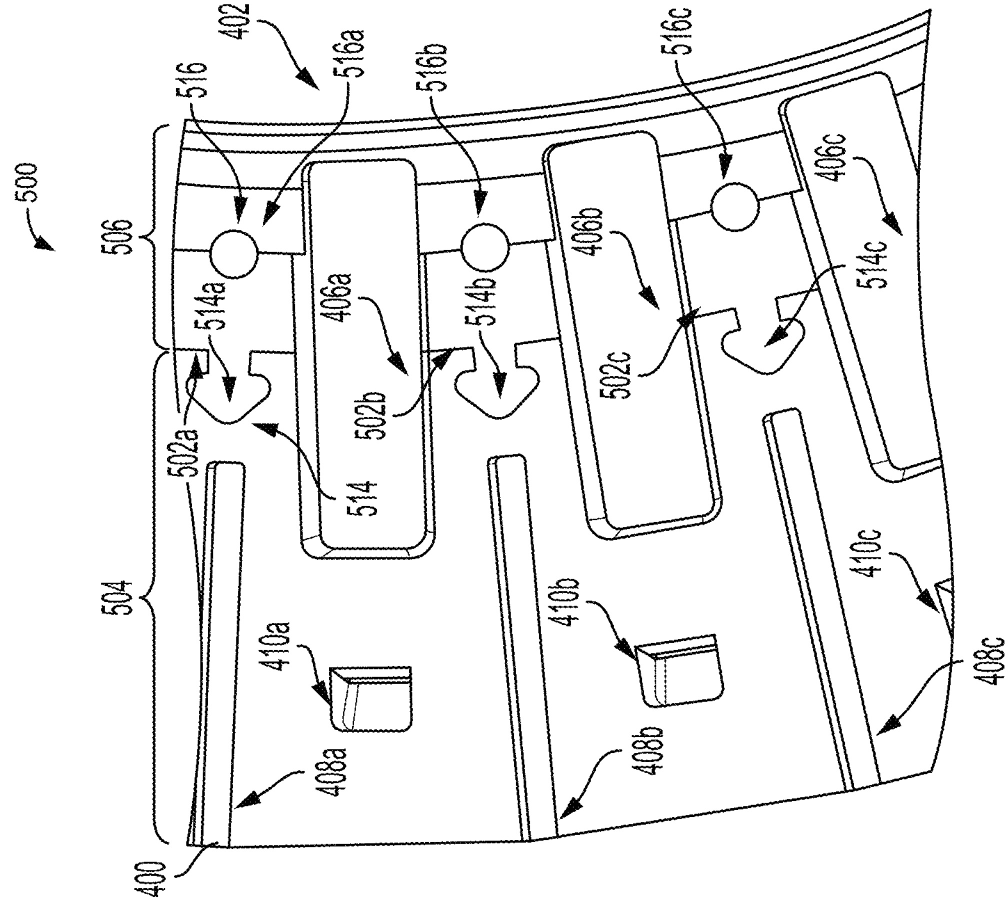

FIGS. 5A and 5B depict different views of the sealing ring 400 configured with the seal 402. FIG. 5A specifically shows a top-down view 500 of a portion of the sealing ring 400 and FIG. 5B specifically shows a cross-sectional view 501 of the portion of the sealing assembly. The portion of the sealing ring 400 is depicted in both FIGS. 5A and 5B. The portion of the sealing ring 400 includes the plurality of channels 406, the plurality of surface grooves 408, and the plurality of notches 410 similar to FIG. 4 above. More specifically, a first channel 406*a*, a second channel 406*b*, and a third channel 406*c* of the plurality of channels 406 are depicted. A first surface groove 408*a*, a second surface groove 408*b*, and a third surface groove 408*c* of the plurality of surface grooves 408 are also depicted. Further, a first notch 410*a*, a second notch 410*b*, and a third notch 410*c* of the plurality of notches 410 are depicted.

The portion of the sealing ring 400 further includes an elevated region 504 and a depressed region 506. The elevated region 504 is positioned near an outer diameter of the sealing ring 400 and configured with a plurality of anchors 514, such as a first anchor 514*a*, a second anchor 514*b*, and a third anchor 514*c* that prevent extrusion of the seal 402. The depressed region 506 is positioned near an inner diameter of the sealing ring 400. A plurality of retention posts 516, including a first retention post 516*a*, a second retention post 516*b*, and a third retention post 516*c* are positioned in the depressed region of the sealing ring 400 to couple the seal 402 to the sealing ring 400. The seal 402 is integrated along an inner edge of the sealing ring 400 and extends from the inner diameter to the elevated region 504 of the sealing ring.

The sealing ring 400 is configured such that each anchor is configured with a rounded triangle portion and a rectangular portion that is contiguous with the rounded triangle portion. Each anchor is positioned at a boundary between an elevated portion 504 and a depressed portion 506. As an example, each of the first anchor 514*a*, the second anchor 514*b*, and the third anchor 514*c* are configured with the rounded triangle portion and a rectangular portion that is contiguous with the rounded triangle portion. The plurality of anchors 514 is designed to prevent extrusion of the seal 402. Additionally, each of the first anchor 514*a*, the second anchor 514*b*, and the third anchor 514*c* are positioned at a boundary between the elevated portion 504 and the depressed portion 506. In particular, the first anchor 514*a* may be positioned at a first boundary 502*a*, the second anchor 514*b* may be positioned at a second boundary 502*b*, and the third anchor 514*c* may be positioned at a third boundary 502*c* between the elevated region 504 and the depressed region 506.

The plurality of surface grooves 408 and the plurality of notches 410 are located in the elevated region 504 of the sealing ring 400. In particular, the first surface groove 408*a*, the second surface groove 408*b*, and the third surface groove 408*c* are located in the elevated region 504 and extend from the outer edge of the sealing ring 400 to a medial region of the sealing ring 400. The plurality of surface grooves 408 is aligned with the plurality of anchors 514 and the plurality of retention posts 516. The plurality of retention posts 516 are positioned within the depressed region such that a center of each retention post is positioned between an inner diameter of the sealing ring 400 and a respective anchor. As an example, a center of the first retention post 516*a* may be positioned between the inner diameter of the sealing ring 400 and the first anchor 514*a*, a center of the second retention post 516*b* may be positioned between the inner diameter of the sealing ring 400 and the second anchor 514*b*, and a center of the third retention post 516*c* may be positioned between the inner diameter of the sealing ring 400 and the third anchor 514*c*.

The plurality of surface grooves 408 may be spaced apart from the plurality of anchors 514 by a first pre-determined distance and the plurality of anchors may be spaced apart from the plurality of retention posts 516 by a second pre-determined distance. As an example, the first surface groove 408*a* may be spaced apart from the first anchor 514*a* by the first pre-determined distance and the first anchor may be spaced apart from the first retention post 516*a* by the second pre-determined distance. The second surface groove

408*b* may be spaced apart from the second anchor 514*b* by the first pre-determined distance and the second anchor may be spaced apart from the second retention post 516*b* by the second pre-determined distance. The third surface groove 408*c* may be spaced apart from the third anchor 514*c* by the first pre-determined distance and the third anchor may be spaced apart from third retention post 516*c* by the second pre-determined distance.

Turning to FIG. 5B, the cross section of the seal 402 includes a first section 402*a*, a second section 402*b*, and a third section 402*c*. The first section 402*a* of the seal 402 extends from the center of a retention post to an anchor and the second section 402*b* of the seal extends from the center of the retention post to an inner portion 510 of the inner diameter (or inner edge) of the sealing ring. The third section 402*c* extends from the inner portion 510 of the inner diameter (or inner edge) of the sealing ring.

The shape of the first section 402*a* of the seal 402 is defined by the portion of the elevated region 504 that includes the anchor and a center of the retention post that is positioned in the depressed region 506. Similarly, the shape of the second section 402*b* of the seal 402 is defined by the inner portion 510 of the inner diameter (or inner edge) of the sealing ring and the center of the retention post. The shape of the third section 402*c* of the seal 402 is defined by the portion of the depressed region 506 that includes the inner portion 510 of the inner diameter (or inner edge) and the outer portion 512 of the of the inner diameter (or inner edge) of the sealing ring.

For example, the first section 402*a* of the seal 402 extends from the center of the first retention post 516*a* to the first anchor 514*a*. The second section 402*b* of the seal 402 extends from the inner portion 510 of the inner diameter (or inner edge) to the center of the first retention post 516*a*. The third section 402*c* of the seal 402 extends from the inner portion 510 of the inner diameter (or inner edge) to the outer portion 512 of the inner diameter (or inner edge). In this way, the shape of the first section 402*a*, the second section 402*b*, and the third section 402*c* of the seal 402 are defined by the shape of the sealing ring 400.

More specifically, the shape of the first section 402*a* of the seal 402 is defined by the portion of the elevated region 504 that includes the first anchor 514*a* and the center of the first retention post 516*a* in the depressed region 506. Similarly, the shape of the second section 402*b* of the seal 402 is defined by the inner portion 510 of the inner diameter (or inner edge) of the sealing ring and the center of the first retention post 516*a*. The shape of the third section 402*c* of the seal 402 is defined by the inner portion 510 of the inner diameter (or inner edge) of the sealing ring and the outer portion 512 of the inner diameter (or inner edge) of the sealing ring 400.

A height of the first section 402*a* of the seal 402 that is positioned on a side of the respective retention post that is closest to the outer diameter (or outer edge) of the sealing ring is greater than a height of a second section 402*b* of the seal that is positioned on another side of the respective retention post that is closest to the inner portion 510 of the inner diameter. A height of a third section 402*c* of the seal that is positioned at the outer portion 512 of the inner diameter (or inner edge) of the sealing ring 400 is greater than the height of the second section 402*b* of the seal that is positioned on a side of the respective retention post that is closest to the inner portion 510 of the inner diameter. The height of third section 402*c* is greater than that of the second section 402*b* due to the outer portion 512 of the inner diameter (inner edge) of the sealing ring inclining vertically relative to the inner portion 510 of the inner diameter (inner edge) of the sealing ring 400.

As an example, the height of the first section 402*a* of the seal 402 that is positioned on a side of the first retention post 516*a* that is closest to the outer diameter (or outer edge) of the sealing ring is greater than a height of the second section 402*b* of the seal that is positioned on another side of the first retention post 516*a* that is closest to the inner portion 510 of the inner diameter. A height of a third section 402*c* of the seal 402 that is positioned at the outer portion 512 of the inner diameter (or inner edge) of the sealing ring 400 is greater than the height of the second section 402*b* of the seal that is positioned on the side of the first retention post 516*a* that is closest to the inner portion 510 of the inner diameter.

The disclosure also provides support for a sealing ring configured for a seal, comprising: a flange positioned on one side of the sealing ring, a plurality of channels that is positioned radially on the sealing ring, a plurality of notches that are aligned with each channel, a plurality of surface grooves wherein each surface groove is positioned between two adjacent channels, an elevated region that is positioned near an outer diameter of the sealing ring and configured with a plurality of anchors that retain the seal, a depressed region that is positioned near an inner diameter of the sealing ring, a plurality of retention posts positioned in the depressed region of the sealing ring, a peripheral groove positioned on a peripheral edge of the sealing ring and spaced between two sides of the sealing ring, and wherein the seal is integrated along an inner edge of the sealing ring and extends from the inner diameter to the elevated region of the sealing ring.

In a first example of the system, the plurality of notches and the plurality of surface grooves are located in the elevated region of the sealing ring. In a second example of the system, optionally including the first example, the plurality of surface grooves is aligned with the plurality of anchors and the plurality of retention posts. In a third example of the system, optionally including one or both of the first and second examples, the plurality of notches is spaced apart from each other by one surface groove. In a fourth example of the system, optionally including one or more or each of the first through third examples, each anchor is configured with a rounded triangle portion and rectangular portion that is contiguous with the rounded triangle portion.

In a fifth example of the system, optionally including one or more or each of the first through fourth examples, each anchor is positioned at a boundary between the elevated region and the depressed region. In a sixth example of the system, optionally including one or more or each of the first through fifth examples, the plurality of retention posts positioned in the depressed region comprises a center of each retention post being positioned between the inner diameter of the sealing ring and a respective anchor.

In a seventh example of the system, optionally including one or more or each of the first through sixth examples, a height of a first section of the seal that is positioned on a side of a respective retention post that is closest to the outer diameter of the sealing ring is greater than a height of a second section of the seal that is positioned on another side of the respective retention post that is closest to an inner portion of the inner diameter. In an eighth example of the system, optionally including one or more or each of the first through seventh examples, the wherein a height of third section of the seal that is positioned at an outer portion of the inner diameter of the sealing ring is greater than the height of the second section of the seal that is positioned on a side of the respective retention post that is closest to the inner portion of the inner diameter.

The disclosure also provides support for an electric motor sealing assembly, comprising, a sealing ring configured with a seal and flange and is coupled to a stator, wherein the seal is spaced between the sealing ring and the stator on one side of the electric motor sealing assembly and comprises: the seal being coupled to the sealing ring along an inner diameter of the sealing ring via coupling features integrated within the sealing ring, the coupling features being a plurality of anchors, a plurality of retention posts, an elevated region, and a depressed region, and a sealing sleeve that extends from an axial side of the sealing ring and surrounds the sealing ring, forming a cavity wherein a stator end winding is at least partially immersed in a coolant.

In a first example of the system, the seal is compressed by the stator and the sealing sleeve to contain coolant within the cavity. In a second example of the system, optionally including the first example, the seal is spaced between the sealing ring and the stator on one side of the electric motor sealing assembly comprises the seal being positioned between a stator face of the stator and the sealing ring. In a third example of the system, optionally including one or both of the first and second examples, the stator face has a 2.0 mm width sealing land.

In a fourth example of the system, optionally including one or more or each of the first through third examples, the electric motor sealing assembly is included in an electric motor cooling system. In a fifth example of the system, optionally including one or more or each of the first through fourth examples, the coolant is an oil. In a sixth example of the system, optionally including one or more or each of the first through fifth examples, the seal is elastomeric and a seal geometry enables constant sealing pressure and contact width.

The disclosure also provides support for an immersion cooling system for an electric motor, comprising: a sealing ring coupled to a stator that axially extends outward from an axial side of the stator wherein the sealing ring comprises a flange and a stator seal formed between the sealing ring and a stator face, a sealing sleeve that axially extends outward from an axial side of the sealing ring, comprising: a face seal formed between the sealing sleeve and a motor housing, and a radial seal formed between the sealing sleeve and the flange, a cavity formed between the sealing ring and the sealing sleeve in which a stator end winding is at least partially immersed in oil, and wherein the sealing ring and the sealing sleeve are axially compressed between the axial side of the stator and an interior surface of the motor housing.

In a first example of the system, the stator seal is integrated into the sealing ring along an inner edge of the sealing ring and extends from the inner edge toward a medial region of the sealing ring. In a second example of the system, optionally including the first example, the sealing ring is configured with a plurality of channels wherein coolant flows through and a plurality of coupling features that enable coupling of the stator seal and the sealing ring, the plurality of coupling features including a plurality of anchors positioned at boundaries between an elevated region and a depressed region and a plurality of retention posts positioned between the inner edge of the sealing ring and the plurality of anchors. In a third example of the system, optionally including one or both of the first and second examples, the stator seal is aligned with the inner edge of the stator where a seal land is positioned to prevent coolant from leaking into a rotor cavity of the electric motor.

The technical effect of integrating a stator seal onto a sealing ring of a motor cooling system is that stator end windings may be cooled within a sealed cavity that reduce the chance of (e.g., avoids) coolant leakage into the rotor cavity from an interface between the stator and the sealing ring, thereby increasing motor efficiency.

FIGS. 1-5B are drawn approximately to scale, aside from the schematically depicted components. However, the components may have other relative dimensions, in other embodiments.

FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such.

Note that the example control and estimation routines included herein can be used with various motor configurations. The control methods and routines disclosed herein may be stored as executable instructions in non-transitory memory and may be carried out by the control system including the controller in combination with the various sensors, actuators, and other electric drive and/or vehicle hardware in combination with the electronic controller. As such, the described actions, operations, and/or functions may graphically represent code to be programmed into non-transitory memory of the computer readable storage medium in the vehicle and/or driveline control system. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A sealing ring configured for a seal, comprising:
- a flange positioned on one side of the sealing ring;
- a plurality of channels that is positioned radially on the sealing ring;
- a plurality of notches that is aligned with each channel;
- a plurality of surface grooves wherein each surface groove is positioned between two adjacent channels;
- an elevated region that is positioned near an outer diameter of the sealing ring and configured with a plurality of anchors that retain the seal;
- a depressed region that is positioned near an inner diameter of the sealing ring;
- a plurality of retention posts positioned in the depressed region of the sealing ring;
- a peripheral groove positioned on a peripheral edge of the sealing ring and spaced between two sides of the sealing ring; and
- wherein the seal is integrated along an inner edge of the sealing ring and extends from the inner diameter to the elevated region of the sealing ring.

2. The sealing ring configured for the seal of claim 1, wherein the plurality of notches and the plurality of surface grooves are located in the elevated region of the sealing ring.

3. The sealing ring configured for the seal of claim 2, wherein the plurality of surface grooves is aligned with the plurality of anchors and the plurality of retention posts.

4. The sealing ring configured for the seal of claim 2, wherein the plurality of notches is spaced apart from each other by one surface groove.

5. The sealing ring configured for the seal of claim 1, wherein each anchor is configured with a rounded triangle portion and rectangular portion that is contiguous with the rounded triangle portion.

6. The sealing ring configured for the seal of claim 5, wherein each anchor is positioned at a boundary between the elevated region and the depressed region.

7. The sealing ring configured for the seal of claim 6, wherein the plurality of retention posts positioned in the depressed region comprises a center of each retention post being positioned between the inner diameter of the sealing ring and a respective anchor.

8. The sealing ring configured for the seal of claim 7, wherein a height of a first section of the seal that is positioned on a side of a respective retention post that is closest to the outer diameter of the sealing ring is greater than a height of a second section of the seal that is positioned on another side of the respective retention post that is closest to an inner portion of the inner diameter.

9. The sealing ring configured for the seal of claim 8, wherein the wherein a height of third section of the seal that is positioned at an outer portion of the inner diameter of the sealing ring is greater than the height of the second section of the seal that is positioned on a side of the respective retention post that is closest to the inner portion of the inner diameter of the sealing ring.

10. An electric motor sealing assembly, comprising,
- a sealing ring configured with a seal and flange and is coupled to a stator, wherein the seal is spaced between the sealing ring and the stator on one side of the electric motor sealing assembly and comprises:
- the seal being coupled to the sealing ring along an inner diameter of the sealing ring via coupling features integrated within the sealing ring, the coupling features being a plurality of anchors, a plurality of retention posts, an elevated region, and a depressed region; and
- a sealing sleeve that extends from an axial side of the sealing ring and surrounds the sealing ring, forming a cavity wherein a stator end winding is at least partially immersed in a coolant.

11. The electric motor sealing assembly of claim 10, wherein the seal is compressed by the stator and the sealing sleeve to contain coolant within the cavity.

12. The electric motor sealing assembly of claim 10, wherein the seal is spaced between the sealing ring and the stator on one side of the electric motor sealing assembly comprises the seal being positioned between a stator face of the stator and the sealing ring.

13. The electric motor sealing assembly of claim 12, wherein the stator face has a 2.0 mm width sealing land.

14. The electric motor sealing assembly of claim 10, wherein the electric motor sealing assembly is included in an electric motor cooling system.

15. The electric motor sealing assembly of claim 10, wherein the coolant is an oil.

16. The electric motor sealing assembly of claim 10, wherein the seal is elastomeric and a seal geometry enables constant sealing pressure and contact width.

17. An immersion cooling system for an electric motor, comprising:
- a sealing ring coupled to a stator that axially extends outward from an axial side of the stator wherein the sealing ring comprises a flange and a stator seal formed between the sealing ring and a stator face;
- a sealing sleeve that axially extends outward from an axial side of the sealing ring, comprising:
  - a face seal formed between the sealing sleeve and a motor housing; and
  - a radial seal formed between the sealing sleeve and the flange;
- a cavity formed between the sealing ring and the sealing sleeve in which a stator end winding is at least partially immersed in oil; and
- wherein the sealing ring and the sealing sleeve are axially compressed between the axial side of the stator and an interior surface of the motor housing.

18. The immersion cooling system for the electric motor of claim 17, wherein the stator seal is integrated into the sealing ring along an inner edge of the sealing ring and extends from the inner edge toward a medial region of the sealing ring.

19. The immersion cooling system for the electric motor of claim 18, wherein the sealing ring is configured with a plurality of channels wherein coolant flows through and a plurality of coupling features that enable coupling of the stator seal and the sealing ring, the plurality of coupling features including a plurality of anchors positioned at boundaries between an elevated region and a depressed region and a plurality of retention posts positioned between the inner edge of the sealing ring and the plurality of anchors.

20. The immersion cooling system for the electric motor of claim 19, wherein the stator seal is aligned with the inner edge of the stator where a seal land is positioned to prevent coolant from leaking into a rotor cavity of the electric motor.

* * * * *